United States Patent Office 2,899,481
Patented Aug. 11, 1959

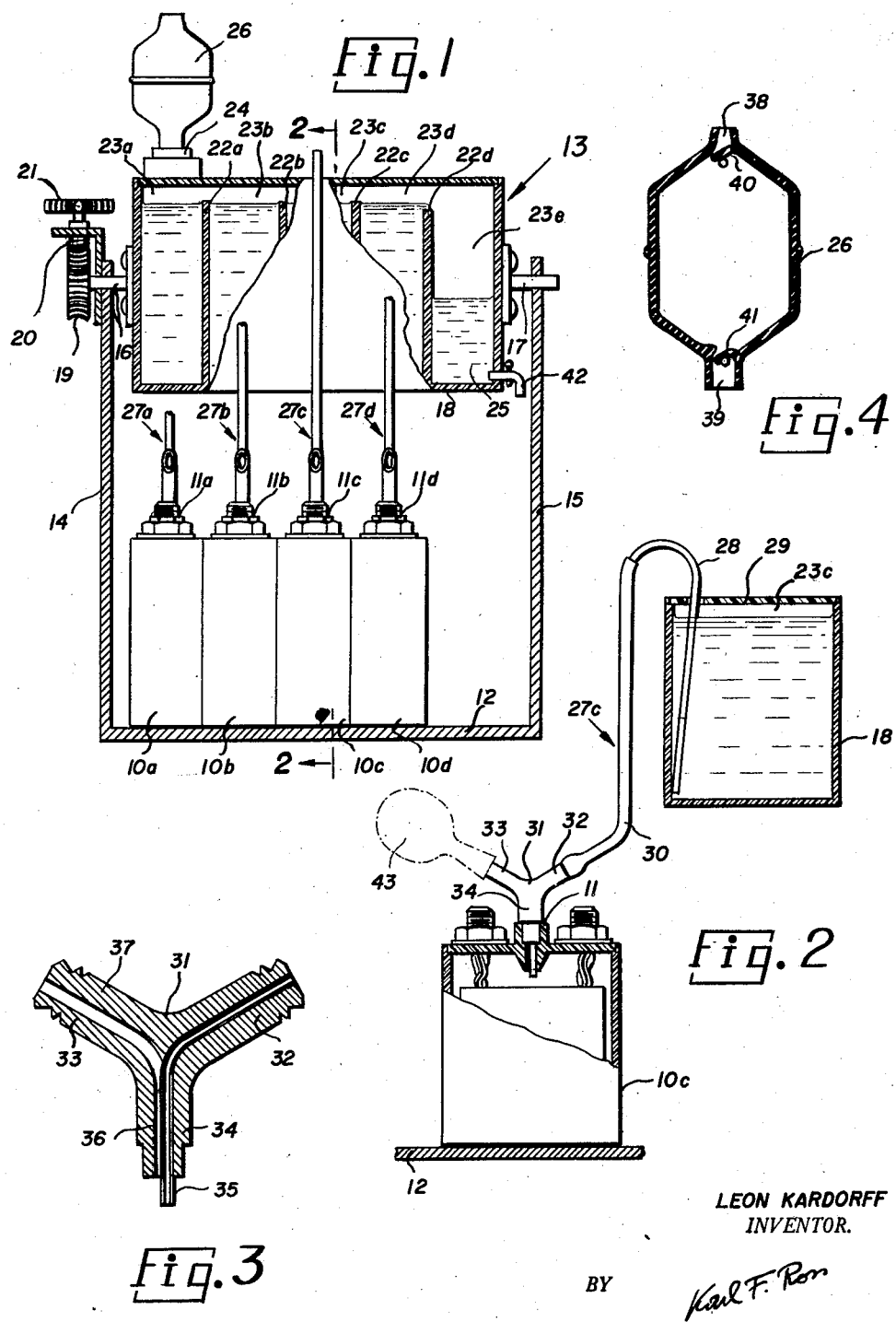
Aug. 11, 1959 — L. KARDORFF — 2,899,481
DEVICE FOR FILLING ELECTRIC BATTERY CELLS
Filed May 26, 1954 — 2 Sheets-Sheet 1
LEON KARDORFF
INVENTOR.
BY
AGENT Aug. 11, 1959    L. KARDORFF    2,899,481
DEVICE FOR FILLING ELECTRIC BATTERY CELLS
Filed May 26, 1954    2 Sheets-Sheet 2
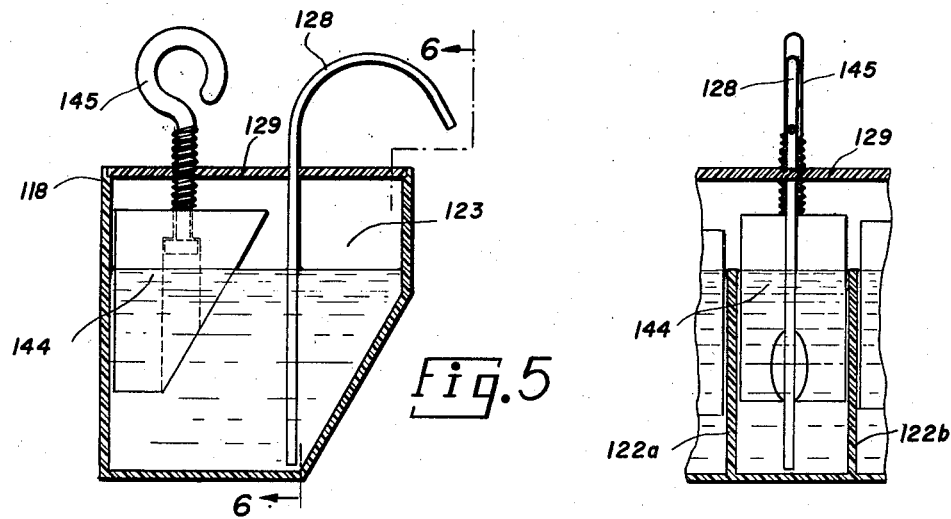
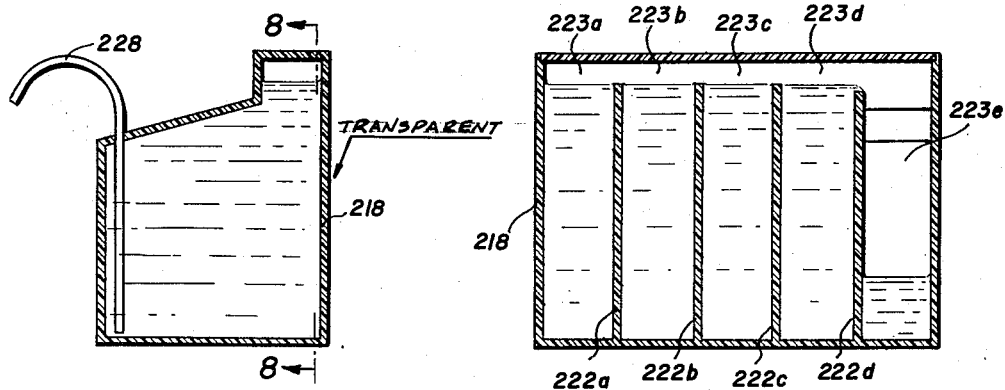
LEON KARDORFF.
INVENTOR.
BY
AGENT

2,899,481

DEVICE FOR FILLING ELECTRIC BATTERY CELLS

Leon Kardorff, Jackson Heights, N.Y., assignor to Telecontrols-International, Inc., New York, N.Y., a corporation of New York Application May 26, 1954, Serial No. 432,465

18 Claims. (Cl. 136—162)

My present invention relates to a device for filling electric battery cells, rechargeable or other, with electrolyte.

In many electric batteries, especially those operating with a limited amount of free electrolyte, the amount of liquid is critical. Batteries of the silver-zinc type, using a zinc-saturated alkaline electrolyte, are in this category.

The principal object of my present invention is to provide a novel and improved device for simultaneously admitting measured amounts of liquid to a plurality of compartments. While the invention is primarily intended for use with electrochemical cells, it will be apparent that the principles embodied therein will also be useful in connection with any other system in which accurate filling of several receptacles is desired.

According to this invention, I provide a container subdivided into a row of compartments by means of several partitions of substantially uniform height, including a series of principal compartments and an overflow compartment at one end of the row; I further provide the container with an inlet opening at or near the end opposite the overflow compartment, and with a plurality of fluid-transfer channels (preferably formed by siphons), individual to the principal compartments, for emptying their contents into respective receptacles.

The final partition, separating the principal compartments from the overflow compartment, is preferably slightly lower than the remaining partitions for the purpose of preventing a bridging of the partitions by a small head of liquid which would build up, owing to surface tension, if all partitions were of the same height.

A further object of my invention is to provide means for adjusting the amount of dispensable liquid in each principal compartment, either individually or simultaneously and uniformly for all such compartments.

The invention will be more fully described with reference to the accompanying drawing in which:

Fig. 1 is a front elevation (parts broken away) of a filling device according to the invention along with a set of cells to be filled;

Fig. 2 is a transverse section taken substantially on the line 2—2 of Fig. 1;

Fig. 3 is a sectional view of an element of the device of Fig. 1, drawn to a larger scale;

Fig. 4 is a sectional view of another element of the device of Fig. 1, drawn to a larger scale;

Fig. 5 is a transverse sectional view of a somewhat modified filling device according to the invention;

Fig. 6 is a fragmentary section taken on the line 6—6 of Fig. 5;

Fig. 7 is a transverse sectional view of a filling device representing still another embodiment of the invention; and Fig. 8 is a section taken on the line 8—8 of Fig. 7.

Referring to Figs. 1–4, there are shown four cells of conventional type, designated 10a, 10b, 10c and 10d, provided with nipples 11a, 11b, 11c and 11d for the introduction of a measured amount of electrolyte. These cells are positioned on the base 12 of a filling device generally designated 13.

A pair of standards 14, 15, rising from the base 12, supports respective gudgeons 16, 17 attached to a prismatic container 18. A pinion 19, secured to gudgeon 16, cooperates with a worm gear 20 to vary the angular position of the container 18 under the control of a knob 21.

A set of partitions 22a, 22b, 22c, 22d subdivides the interior of container 18 into four principal compartments 23a, 23b, 23c, 23d and an overflow compartment 23e. Above the compartment 23a, i.e. the compartment farthest from the overflow compartment 23e, the container is provided with an entrance port 24 for the admission of a liquid electrolyte 25. A compressible bulb 26, of the type used in atomizers or spray guns, is removably inserted in the port 24.

Each of the principal compartments 23a, 23b, 23c, 23d is connected with a respective cell 10a, 10b, 10c, 10d by way of an individual fluid-transfer channel 27a, 27b, 27c, 27d. Each of these channels, as best shown in Fig. 2 for channel 27c, comprises a substantially rigid siphon tube 28 which rises from just above the bottom of container 18 and passes in fluid-tight manner through the lid 29 of the container, a flexible tube 30 attached to the gooseneck of siphon tube 28, and a three-way connector 31 engaging the lower extremity of tube 30 at a point below the bottom of container 18.

The connector 31 is provided with a fluid-intake nozzle 32 connected to tube 30, an air-intake nozzle 33 and a discharge nozzle 34, the latter being inserted in the nipple, such as 11c, of the associated cell.

Within the nozzle 32, as best seen in Fig. 3, a short, bent tube 35 extends toward a bore 36 in nozzle 34 and outwardly beyond the last-mentioned nozzle, the tube 35 being of small enough diameter to leave a clearance in bore 36 which communicates with a similar bore 37 in nozzle 33.

It will thus be seen that the bores 36, 37 define a path through which air may escape from the cell 10c as liquid is introduced into the cell by way of siphon tube 28, flexible tube 30 and filling tube 35.

Reference is now made more particularly to Fig. 4 for a brief description of the construction of compressible bulb 26. This bulb, which may be of rubber, is provided at its top with an air-inlet vent 38 and at its bottom with an air-outlet vent 39. These vents are provided with normally open valve flaps 40 and 41, respectively, which are so biased that manual compression of the bulb will close vent 38 while expelling air through vent 39 whereas subsequent re-expansion of the bulb, upon its release by the user, will aspirate air through the vent 38 while vent 39 is held closed by the increased air pressure within container 18. One or more compressions and re-expansions of the bulb will thus result in a unidirectional pumping of air from the atmosphere into the container 18 by way of port 24.

To operate the device 13, I first introduce sufficient electrolyte 25 into the container 18, through inlet port 24, to let the liquid fill up the first compartment 23a, then overflow the partition 22a and pour into the second compartment 23b, and so on until the last or overflow compartment 23e is reached. When this occurs, as determined by visual inspection of the preferably transparent container or by the appearance of drops at the drain 42, the supply of liquid is shut off and the bulb 26 is reapplied to the port 24. Next, I compress the bulb 26 to create enough pressure within container 18 to drive some liquid into the descending arm 30 of each fluid-transfer channel 27a, 27b, 27c, 27d, to a point below the lower end of ascending arm 28. Siphoning will now take place and will transfer all the liquid from compartment 23a, 23b, 23c, 23d to the corresponding cells 10a, 10b, 10c, 10d, unless such action is impeded or interrupted by the presence of air bubbles in the connection 28, 30. In the latter event I can readily remedy this condition by blowing into the air-intake nipple 33 to clear the siphon connection, e.g. by means of a simple rubber bulb 43 as indicated in dot-dash lines in Fig. 2.

By departing from the normal container position shown in Figs. 1 and 2, in which the upper edges of the partitions 22a, 22b, 22c, 22d are horizontal, I can reduce the effective volume of each compartment 23a, 23b, 23c, 23d without otherwise modifying the operation of my device. This adjustment can readily be made with the aid of knob 21, worm gear 20 and pinion 19.

In Figs. 5 and 6 I have shown other means for varying, this time individually, the volume of a compartment 123 defined by a pair of partitions 122a and 122b. The container 118 is here shown of pentagonal cross-section so as to give each compartment a roughly trapezoidal configuration. A likewise trapezoidal wedge member or plunger 144, controlled by a rod 145 threadedly held in lid 129, is positioned back of the siphon tube 128 and can be raised or lowered between the partitions 122a, 122b to change the amount of liquid the compartment 123 will hold.

The modification of Figs. 7 and 8 is in one sense the converse of the embodiment of Figs. 5 and 6, in that here the aim is not variation but stability of compartment volume in the face of positional changes such as may occur, for example, when the device is used on board ship. By greatly narrowing each compartment 223a, 223b, 223c, 223d near the top of the partitions 222a, 222b, 222c, 222d, I achieve the result that minor variations in the liquid level of the several compartments (due, for example, to a tilting of the container 218) will not materially affect the amount of electrolyte present in each compartment. The overflow compartment is shown at 223e; one of the siphon tubes associated with each principal compartment has been illustrated at 228.

The invention is, of course, not limited to the specific embodiment described and illustrated but is capable of numerous modifications and adaptations without thereby departing from the scope of the appended claims.

I claim:

1. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, said partitions being all of substantially the same height, said container having a filling aperture above the end of said row of principal compartments opposite said overflow compartment, and a plurality of discharge channels each extending from one of said principal compartments to one of said receptacles, respectively, said container having wall portions extending above said partitions and defining a flow channel for said liquid constituting the sole connection between said compartments.

2. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, one of said partitions, separating said overflow compartment from an adjacent principal compartment, being slightly lower than the remaining partitions, all of said remaining partitions being of uniform height, said container having a filling aperture above the end of said row of principal compartments opposite said overflow compartment, and a plurality of discharge channels each extending from one of said principal compartments to one of said receptacles, respectively, said container having wall portions extending above said partitions and defining a flow channel for said liquid constituting the sole connection between said compartments.

3. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, said partitions being all of substantially the same height, said container having a filling aperture above the end of said row of principal compartments opposite said overflow compartment, and a plurality of discharge channels each extending from one of said principal compartments to one of said receptacles, respectively, each of said discharge channels comprising a siphon tube entering the respective principal compartment, said container having wall portions extending above said partitions and defining a flow channel for said liquid constituting the sole connection between said compartments.

4. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, one of said partitions, separating said overflow compartment from an adjacent principal compartment, being slightly lower than the remaining partitions, all of said remaining partitions being of uniform height, said container having a filling aperture above the end of said row of principal compartments opposite said overflow compartment, and a plurality of discharge channels each extending from one of said principal compartments to one of said receptacles, respectively, each of said discharge channels comprising a siphon tube entering the respective principal compartment, said container having wall portions extending above said partitions and defining a flow channel for said liquid constituting the sole connection between said compartments.

5. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, one of said partitions, separating said overflow compartment from an adjacent principal compartment, being slightly lower than the remaining partitions, all of said remaining partitions being of uniform height, said container having a filling aperture above the end of said row of principal compartments opposite said overflow compartment, a plurality of discharge channels each extending from one of said principal compartments to one of said receptacles, respectively, each of said discharge channels comprising a siphon tube entering the respective principal compartment, and means for starting said siphons by creating an excess of pressure within said container, said container having wall portions extending above said partitions and defining a flow channel for said liquid constituting the sole connection between said compartments.

6. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, one of said partitions, separating said overflow compartment from an adjacent principal compartment, being slightly lower than the remaining partitions, all of said remaining partitions being of uniform height, said container having a filling aperture above the end of said row of principal compartments opposite said overflow compartment, a plurality of discharge channels each extending from one of said principal compartments to one of said receptacles, respectively, each of said discharge channels comprising a siphon tube entering the respective principal compartment, and means including a source of air pressure in said filling aperture for starting said siphons by creating an excess of pressure within said container, said container having wall portions extending above said partitions and defining a flow channel for said liquid constituting the sole connection between said compartments.

7. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, said partitions being all of substantially the same height, said container having a filling aperture above the end of said row of principal compartments opposite said overflow compartment, and a plurality of discharge channels each extending from one of said principal compartments to one of said receptacles, respectively, each of said discharge channels comprising a siphon tube entering the respective principal compartment, connector means outside said container provided with two inlet openings and one outlet opening communicating with both of said inlet openings, and conduit means connecting one of said inlet openings with said siphon tube, the other of said inlet openings communicating with the surrounding atmosphere, said container having wall portions extending above said partitions and defining a flow channel for said liquid constituting the sole connection between said compartments.

8. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, said partitions being all of substantially the same height, said container having a filling aperture above the end of said row of principal compartments opposite said overflow compartment, and a plurality of discharge channels each extending from one of said principal compartments to one of said receptacles, respectively, each of said discharge channels comprising a siphon tube entering the respective principal compartment, connector means outside said container provided with two inlet openings and one outlet opening communicating with both of said inlet openings, and conduit means connecting one of said inlet openings with said siphon tube, the other of said inlet openings communicating with the surrounding atmosphere, said connector means including a tube extending with clearance within said outlet opening and further extending through said one of said inlet openings to said conduit means, said container having wall portions extending above said partitions and defining a flow channel for said liquid constituting the sole connection between said compartments.

9. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, said partitions being all of substantially the same height, said container having a filling aperture above the end of said row of principal compartments opposite said overflow compartment, a plurality of discharge channels each extending from one of said principal compartments to one of said receptacles, respectively, and means for adjusting the effective volume of each of said principal compartments, said container having wall portions extending above said partitions and defining a flow channel for said liquid constituting the sole connection between said compartments.

10. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, said partitions being all of substantially the same height, said container having a filling aperture above the end of said row of principal compartments opposite said overflow compartment, a plurality of discharge channels each extending from one of said principal compartments to one of said receptacles, respectively, and means for rotating said container about a horizontal axis, thereby changing the effective volume of each of said principal compartments, said container having wall portions extending above said partitions and defining a flow channel for said liquid constituting the sole connection between said compartments.

11. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, said partitions being all of substantially the same height, said container having a filling aperture above the end of said row of principal compartments opposite said overflow compartment, a plurality of discharge channels each extending from one of said principal compartments to one of said receptacles, respectively, and a plurality of plunger members, insertable to varying depths in respective ones of said principal compartments, for changing the effective volume of said principal compartments, said container having wall portions extending above said partitions and defining a flow channel for said liquid constituting the sole connection between said compartments.

12. A device for introducing measured quantities of liquid into a plurality of receptacles, comprising a container, a plurality of substantially vertical partitions in said container dividing the interior thereof into a plurality of principal compartments arranged in a row and an overflow compartment at the end of said row, said partitions being all of substantially the same height, said container having a filling aperture above the end of said row of principal compartments opposite said overflow compartment, and a plurality of discharge channels each extending from one of said principal compartments to one of said receptacles, respectively, said principal compartments being relatively wide at their bottom and relatively narrow at the level of said partitions, said container having wall portions extending above said partitions and defining a flow channel for said liquid constituting the sole connection between said compartments.

13. A device for introducing measured quantities of liquid into a plurality of receptacles, comprising a container, a plurality of substantially vertical and parallel partitions rising from the bottom of said container, said partitions dividing the interior of said container into a row of principal compartments and an overflow compartment at the end of said row, said container being provided with a filling aperture above the end of said row opposite said overflow compartment, all of said partitions being of substantially uniform height, and a plurality of siphon tubes, one in each of said principal compartments, extending above the level of said partitions and emerging from said container, said container having wall portions extending above said partitions and defining a flow channel for said liquid constituting the sole connection between said compartments.

14. A device for introducing measured quantities of liquid into a plurality of receptacles, comprising a container, a plurality of substantially vertical and parallel partitions rising from the bottom of said container, said partitions dividing the interior of said container into a row of principal compartments and an overflow compartment at the end of said row, said container being provided with a filling aperture above the end of said row opposite said overflow compartment, all of said partitions being of substantially uniform height, a plurality of siphon tubes, one in each of said principal compartments, extending above the level of said partitions and emerging from said container, and means on said container for observing the entrance of liquid from the last of said principal compartments into said overflow compartment, said container having wall portions extending above said partitions and defining a flow channel for said liquid constituting the sole connection between said compartments.

15. A device for introducing measured quantities of liquid into a plurality of receptacles, comprising a container, a plurality of substantially vertical and parallel partitions rising from the bottom of said container, said partitions dividing the interior of said container into a row of principal compartments and an overflow compartment at the end of said row, said container being provided with a filling aperture above the end of said row opposite said overflow compartment, all of said partitions being of substantially uniform height, a plurality of siphon tubes, one in each of said principal compartments, extending above the level of said partitions and emerging from said container, and means including a transparent portion of said container for observing the entrance of liquid from the last of said principal compartments into said overflow compartment, said container having wall portions extending above said partitions and defining a flow channel for said liquid constituting the sole connection between said compartments.

16. A device for introducing measured quantities of liquid into a plurality of receptacles, comprising a container, a plurality of substantially vertical and parallel partitions rising from the bottom of said container, said partitions dividing the interior of said container into a row of principal compartments and an overflow compartment at the end of said row, said container being provided with a filling aperture above the end of said row opposite said overflow compartment, all of said partitions being of substantially uniform height, a plurality of siphon tubes, one in each of said principal compartments, extending above the level of said partitions and emerging from said container, and means including an overflow valve on said container for observing the entrance of liquid from the last of said principal compartments into said overflow compartment, said container having wall portions extending above said partitions and defining a flow channel for said liquid constituting the sole connection between said compartments.

17. A device for introducing measured quantities of liquid into a plurality of receptacles, comprising a container, a plurality of substantially vertical and parallel partitions rising from the bottom of said container, said partitions dividing the interior of said container into a row of principal compartments and an overflow compartment at the end of said row, said container being provided with a filling aperture above the end of said row opposite said overflow compartment, all of said partitions being of substantially uniform height, a plurality of siphon tubes, one in each of said principal compartments, extending above the level of said partitions and emerging from said container, and means on said container for observing the spilling of liquid over the last of said partitions into said overflow compartment, said last partition being slightly lower than the remainder of said partitions, said container having wall portions extending above said partitions and defining a flow channel for said liquid constituting the sole connection between said compartments.

18. A device for introducing measured quantities of liquid into a plurality of receptacles, comprising a container, a plurality of substantially vertical and parallel partitions rising from the bottom of said container, said partitions dividing the interior of said container into a row of principal compartments and an overflow compartment at the end of said row, said container being provided with a filling aperture above the end of said row opposite said overflow compartment, all of said partitions being of substantially uniform height, a plurality of siphon tubes, one in each of said principal compartments, extending above the level of said partitions and emerging from said container, and means in said filling aperture for starting said siphons by creating an excess of pressure within said container, said container having wall portions extending above said partitions and defining a flow channel for said liquid constituting the sole connection between said compartments.

References Cited in the file of this patent

UNITED STATES PATENTS

| | | |
|---|---|---|
| 668,838 | Lavison | Feb. 26, 1901 |
| 842,389 | Decker | Jan. 29, 1907 |
| 1,301,780 | Lotsch | Apr. 22, 1919 |
| 1,381,298 | Gill | June 14, 1921 |
| 1,781,005 | Gill | Nov. 11, 1930 |
| 1,926,343 | Lucke et al. | Sept. 12, 1933 |
| 2,135,158 | Wolford | Nov. 1, 1938 |
| 2,339,642 | LeGro et al. | Jan. 18, 1944 |

FOREIGN PATENTS

| | | |
|---|---|---|
| 26,703 | Great Britain | Dec. 17, 1898 |
| 384,234 | Germany | Oct. 30, 1923 |
| 110,085 | Sweden | Apr. 26, 1933 |
| 1,008,760 | France | May 21, 1952 |